Figure 3:
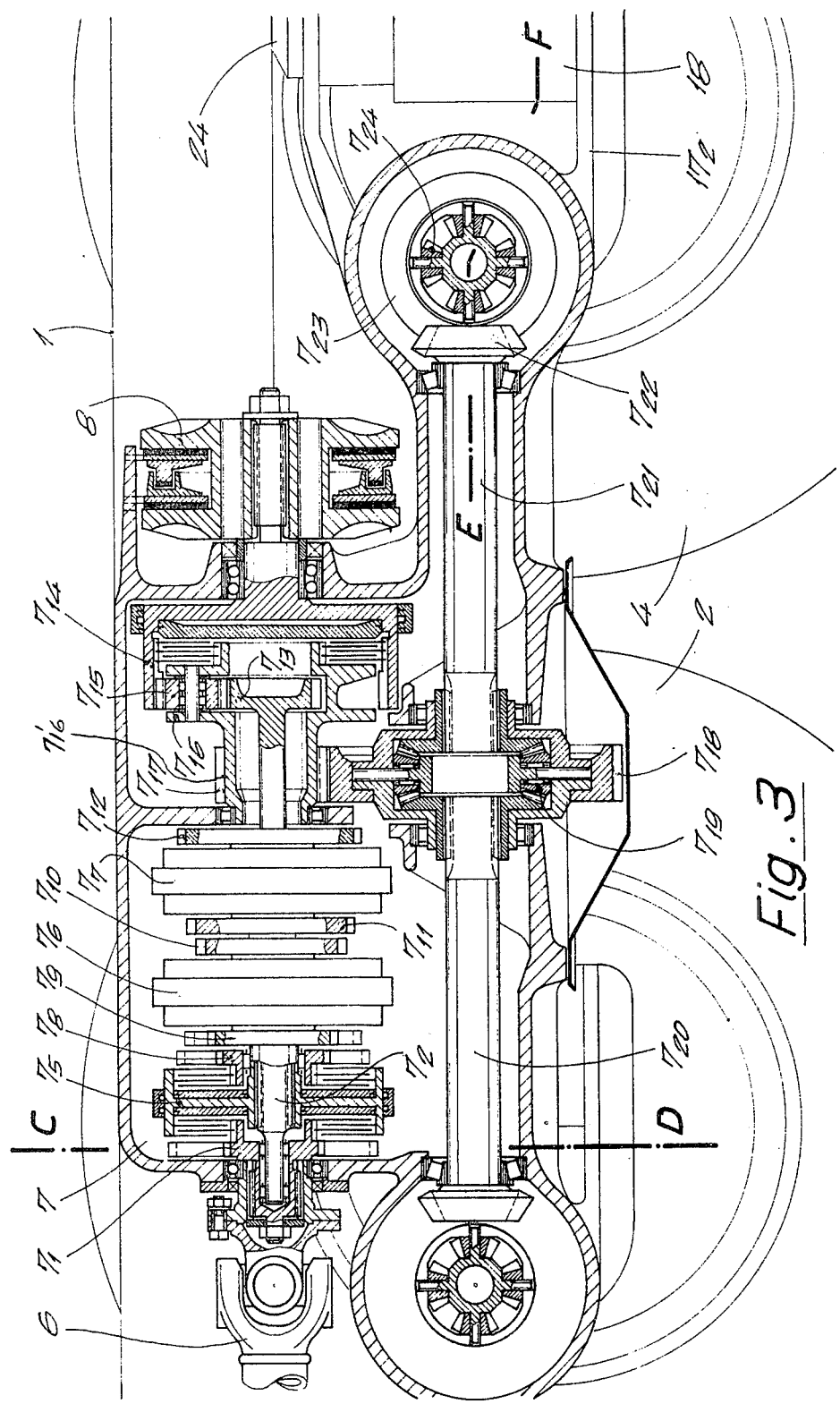

United States Patent [19]
Klaue

[11] 3,945,452
[45] Mar. 23, 1976

[54] DRIVE FOR FOUR-WHEEL DRIVEN MOTOR VEHICLES

[76] Inventor: Hermann Klaue, 24, Tour D'Ivoire, 1820 Montreaux, Switzerland

[22] Filed: May 1, 1973

[21] Appl. No.: 356,208

Related U.S. Application Data

[63] Continuation-in-part of Ser. No. 190,616, Oct. 19, 1976, abandoned.

[30] Foreign Application Priority Data

Sept. 16, 1971  Switzerland...................... 13538/71
Nov. 30, 1972  Switzerland...................... 17469/72

[52] U.S. Cl. ........... 180/24.09; 74/740; 188/264 D; 180/44 R
[51] Int. Cl. ........................................... B60k 17/34
[58] Field of Search .... 180/44 R, 44 E, 44 M, 44 F, 180/24.09; 74/740, 789

[56] References Cited
UNITED STATES PATENTS

| | | | |
|---|---|---|---|
| 830,642 | 9/1906 | Chaquette | 180/44 R |
| 1,768,489 | 6/1930 | Remington | 74/773 |
| 1,966,846 | 7/1934 | Cassagne | 74/773 |
| 2,772,582 | 12/1956 | Gerst | 180/44 R |
| 2,796,941 | 6/1957 | Hill | 180/44 R |
| 2,912,184 | 11/1959 | Lee | 180/44 R X |
| 3,022,867 | 2/1962 | Maloney et al. | 188/264 D |
| 3,235,021 | 2/1966 | Hill | 180/44 R |

FOREIGN PATENTS OR APPLICATIONS

| | | | |
|---|---|---|---|
| 201,447 | 5/1955 | United Kingdom | 180/44 R |
| 308,961 | 4/1929 | United Kingdom | 74/489 |

*Primary Examiner*—Kenneth H. Betts
*Attorney, Agent, or Firm*—Larson, Taylor and Hinds

[57] ABSTRACT

In a vehicle a drive unit adapted to drive four wheels, the wheels being driven by axle shafts. The drive unit comprises a change speed transmission with its longitudinal axis extending lengthwise to the vehicle longitudinal direction. The drive unit further comprises a transfer gear assembly connected to the output of the transmission and to two transfer shafts which extend parallel to the vehicle longitudinal direction. The drive unit further comprises differential gears driven by the transfer shafts and driving the axle shafts. A housing encloses commonly the change speed transmission, the transfer gear assembly, at least one of the transfer shafts and at least one of the differential gears. The vehicle may be equipped with a starting device attached to the drive unit and employing a brake assembly which may be watercooled.

13 Claims, 11 Drawing Figures

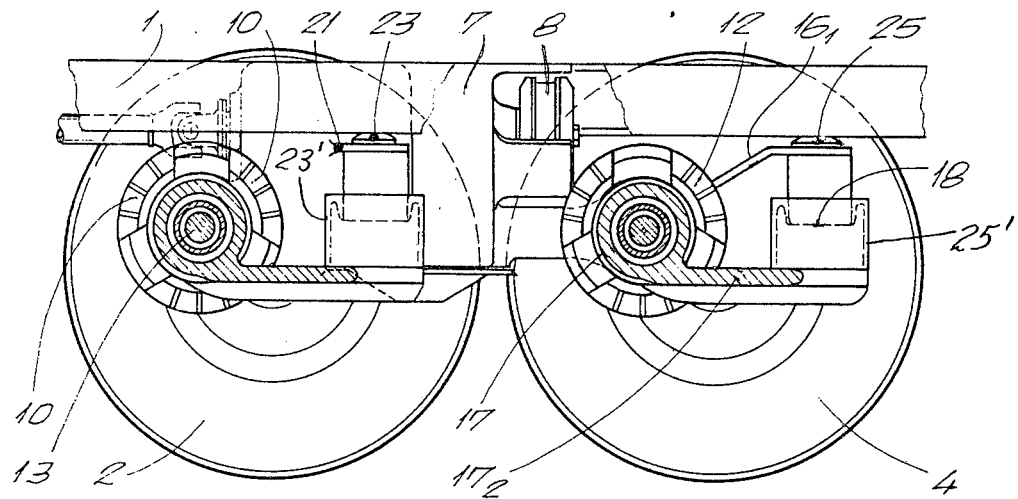
*Fig. 1 (A-B)*
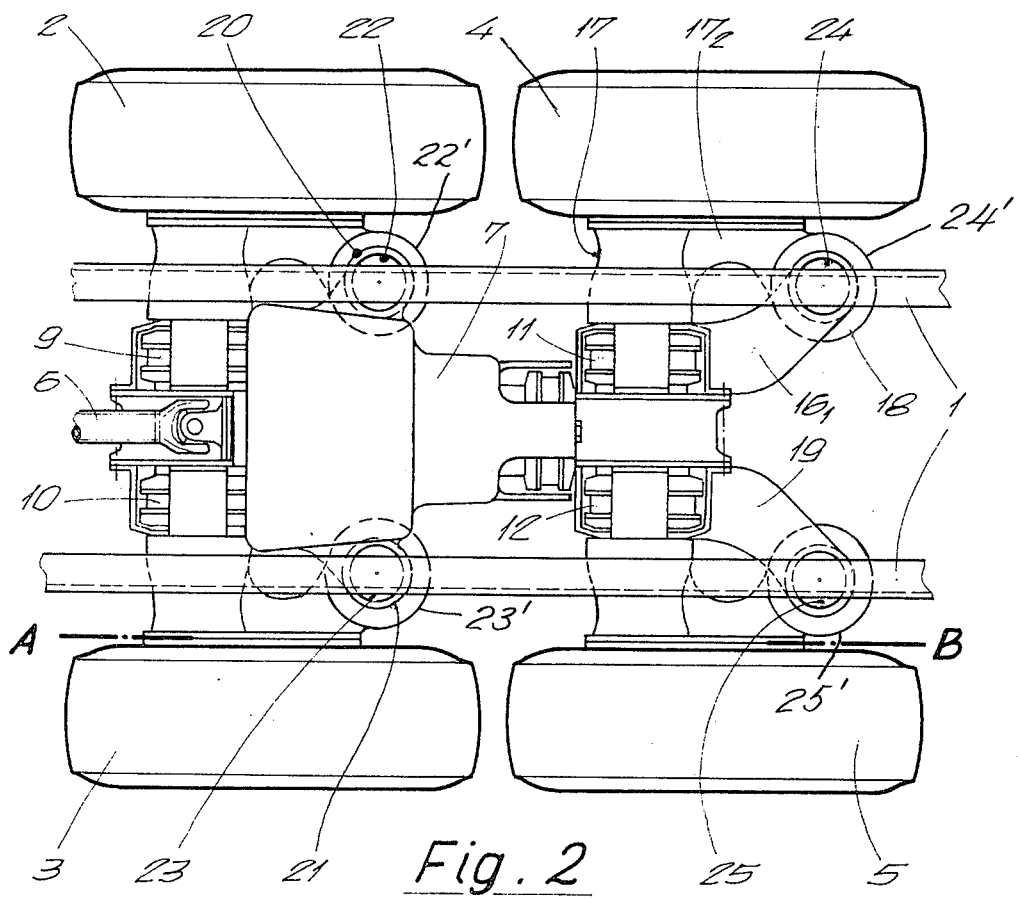
*Fig. 2*

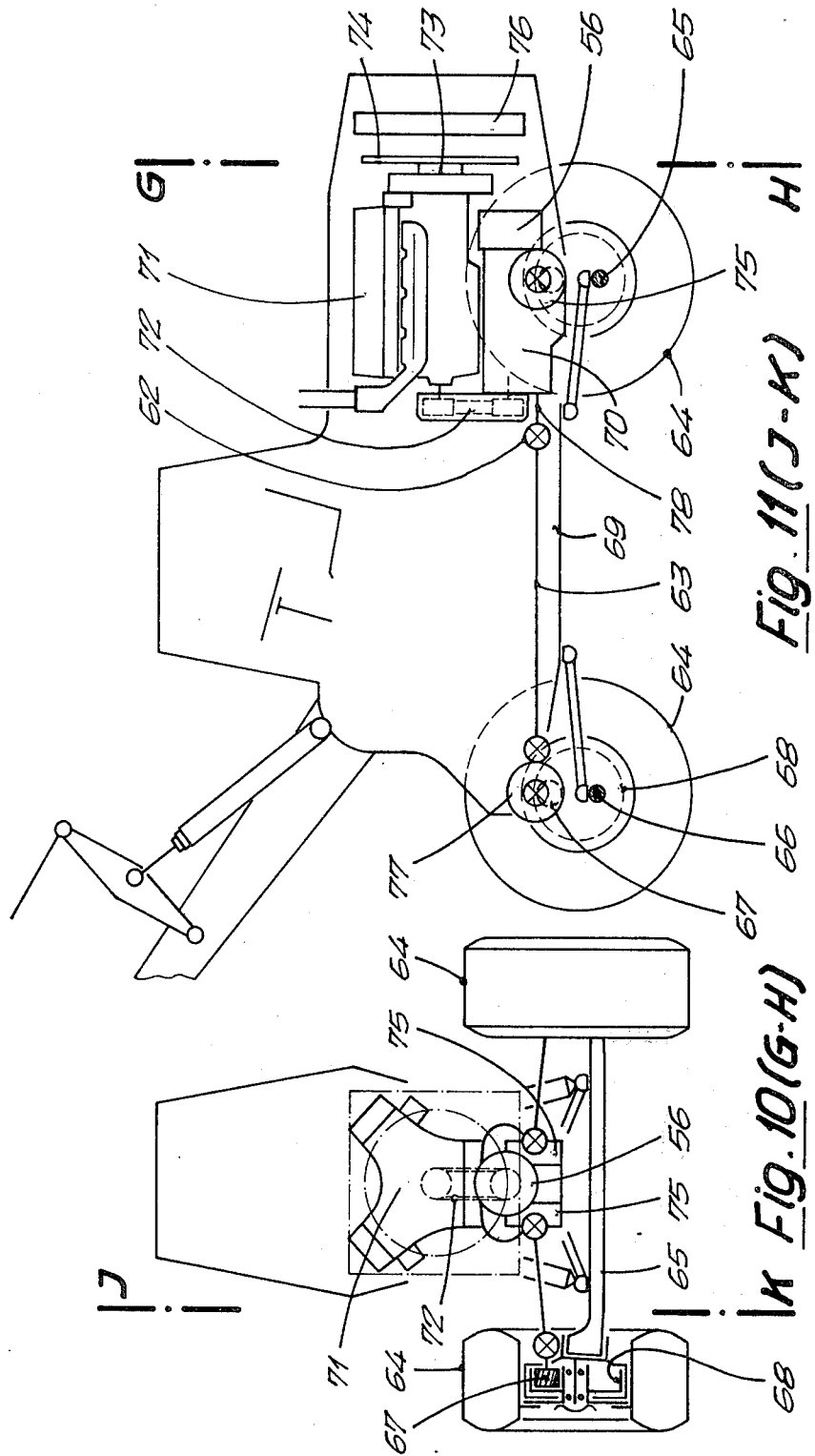

DRIVE FOR FOUR-WHEEL DRIVEN MOTOR VEHICLES

This application is a continuation-in-part of my prior copending application Ser. No. 190,616 filed Oct. 19, 1971, now abandoned.

BACKGROUND OF INVENTION

The present invention relates to a drive for four-wheel driven motor vehicles such as lorries, buses and tractors.

In four-wheel drives for lorries, buses or tractors having six or more wheels it has so far been usual to equip the four driven wheels with separate driving axles, the connection between the driving axles and the change speed transmission being effected via universal-joint shafts. This solution presents the disadvantage that the universal-joint shafts have to transmit very high torques in the low gear. In vehicles driven by turbines there arises the additional disadvantage that the overall speed transformation must be effected substantially in the transmission range so that an input or an output transmission must be arranged at the input or output of the change speed transmission. Until today the vehicles were mainly equipped with friction clutches for starting operation which have to be actuated by hand, in heavy cars hydraulically or pneumatically by means of jaw means.

In order to relieve the driver especially in fast running lorries or omnibuses there is the demand to facilitate the manual operation. The provision of hydrodynamic torque converters would meet this demand, but converters show the known disadvantages in causing a 8 to 10 % loss of power. Another proposal was to provide the transmission with brake means located within the oil filled transmission box. But this arangement causes increased heat dissipation and affords the provision of large filter means. The present invention eliminates the disadvantages arising in connection with the used drive constructions and the use of starting clutches.

Accordingly it is the main object of this invention to provide a new drive for four-wheel driven vehicles employing a new drive unit.

It is further an object of this invention to provide a new compact mounting of the substantial parts of this drive unit so that a common housing enclosing all drive unit parts may be provided.

It is further an object of this invention to provide a suspension of the drive unit on the chassis frame.

A further object of this invention is to equip the drive with a new starting device replacing the starting clutch usually provided between the engine and the drive input, the starting device employing a watercooled brake.

Figure 4:
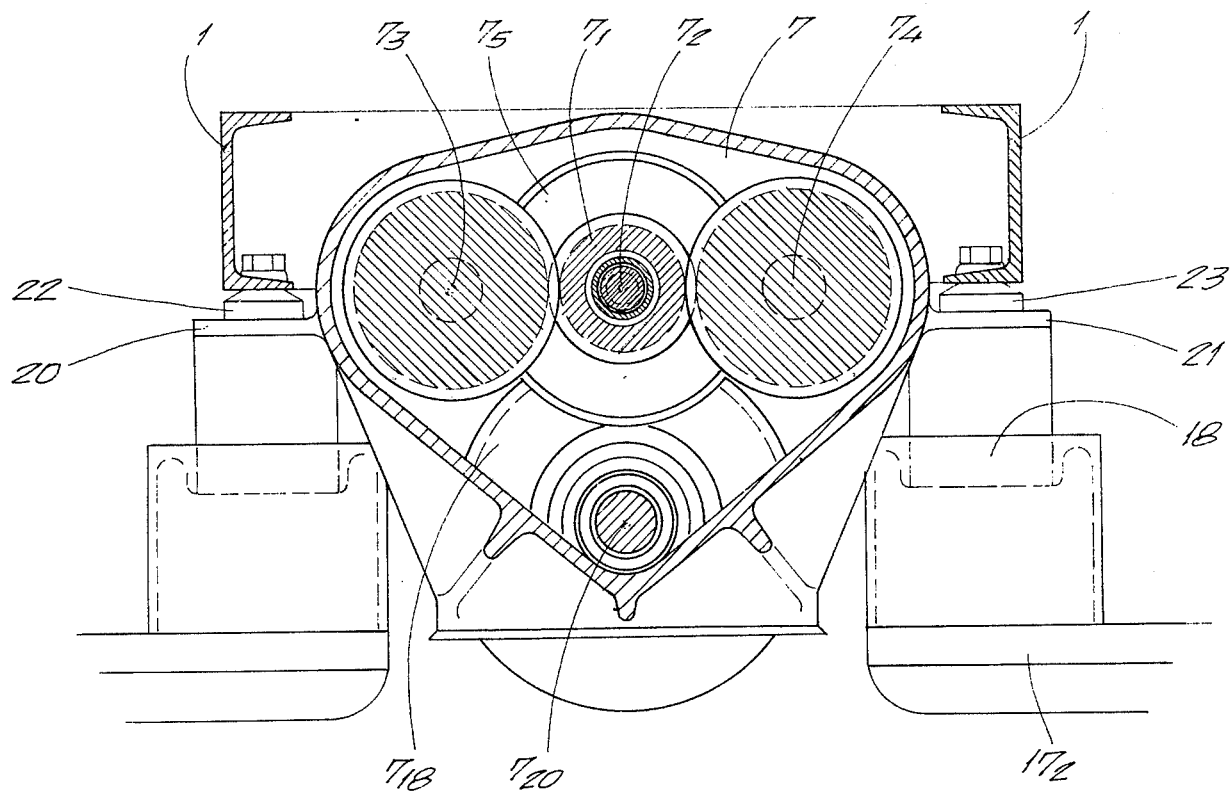
Figure 5:
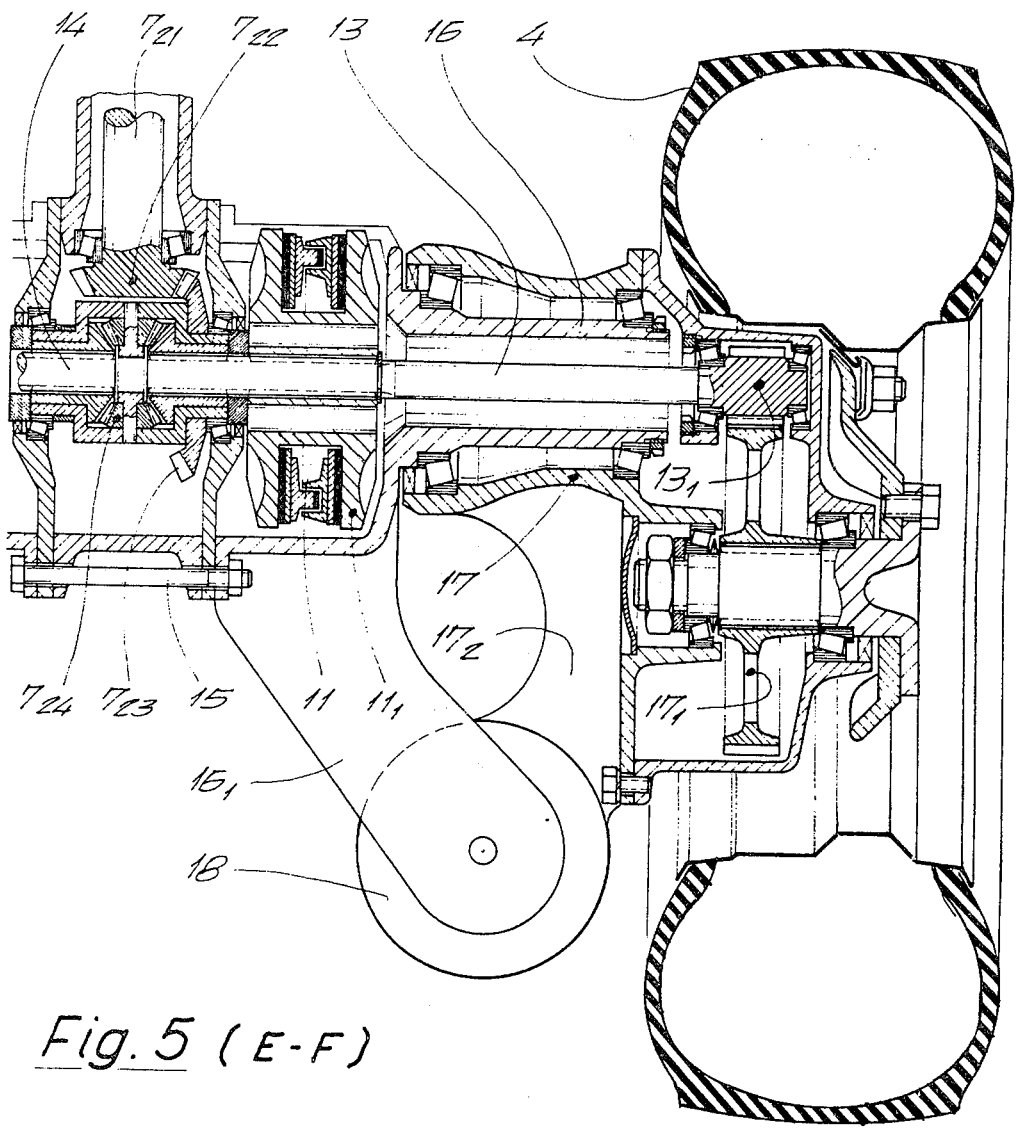
Figure 6:
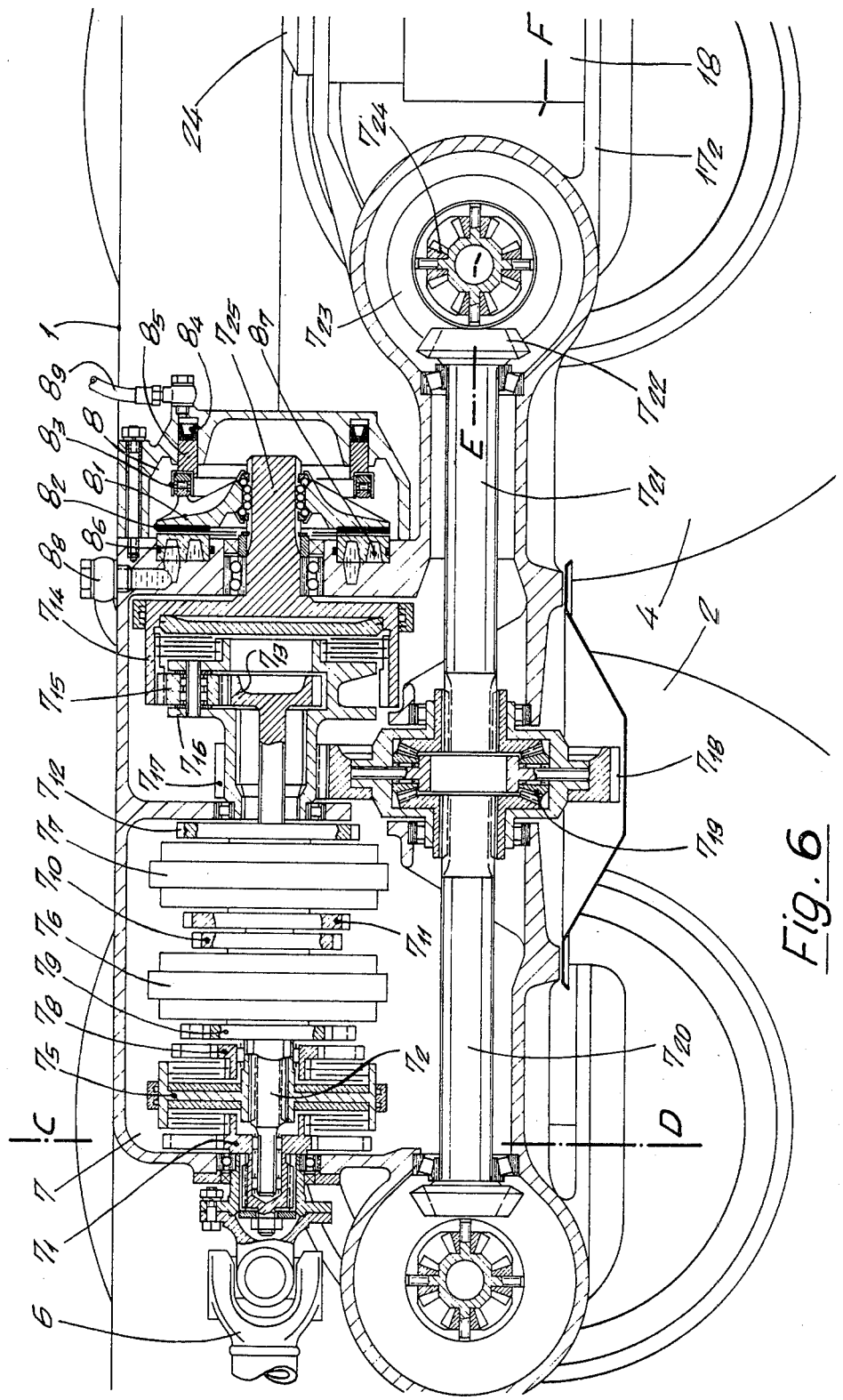
Figure 7:
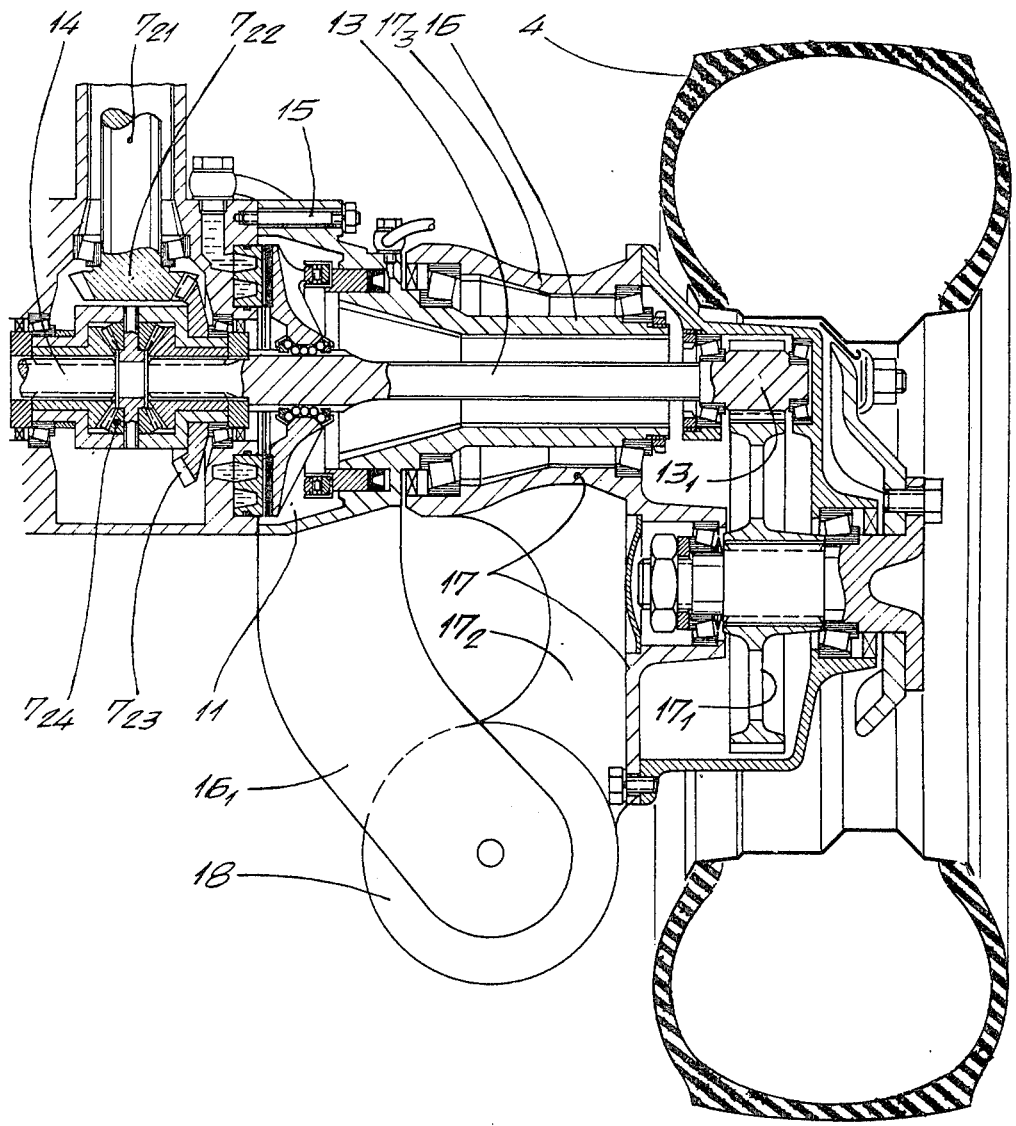

The foregoing and other objects and advantages will become apparent in view of the following description taken in conjunction with the drawings, wherein:

FIG. 1 is a vertical cross sectional view taken along the line A — B of FIG. 2 illustrating a side view of a drive unit located in the rear part of a heavy lorry, FIG. 2 is a plan view on the rear part of the lorry of FIG. 1, FIG. 3 is a vertical cross sectional view illustrating the interior of the drive unit of FIG. 1, FIG. 4 is a cross section view through the transmission taken along the C — D of FIG. 3, FIG. 5 is a cross section sectional view taken along the line E — F of FIG. 3 illustrating the suspension of a wheel, FIG. 6 is a vertical cross sectional view through a further embodiment of a drive unit similar to the embodiment of FIGS. 1 to 5, employing a different water-cooled starting brake and different water-cooled disc brakes, FIG. 7 is a cross section sectional view taken along the line E — F of FIG. 6

Figure 8:
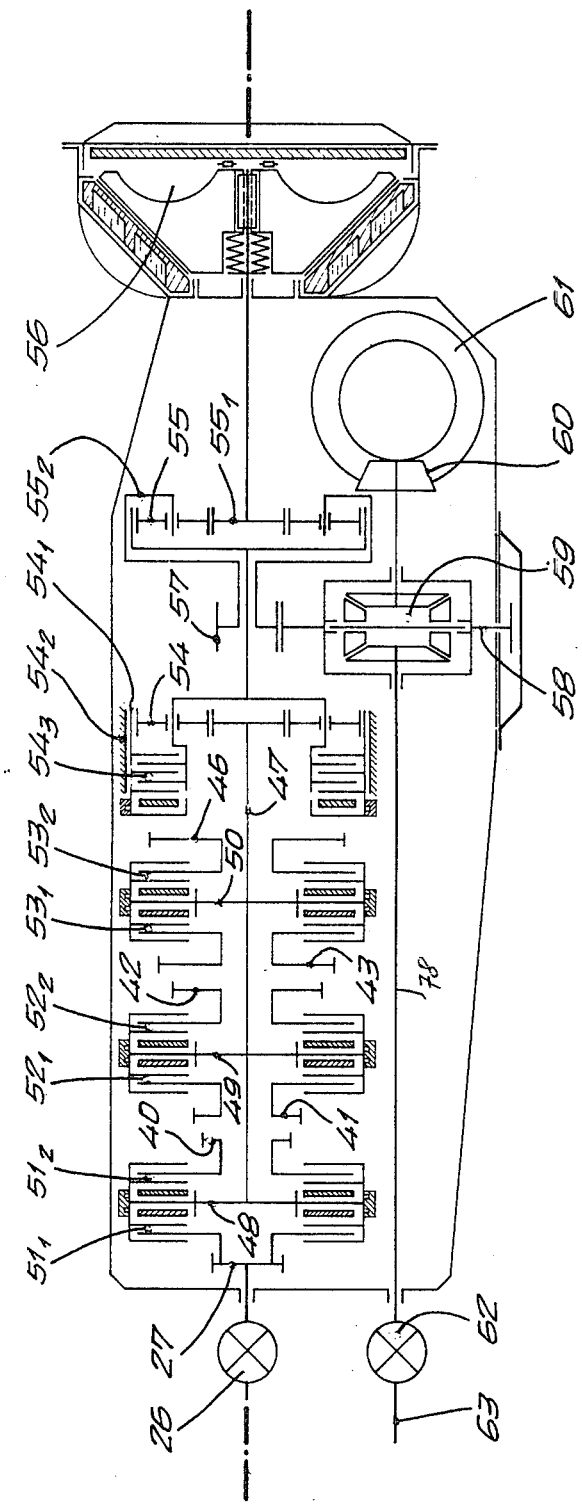
Figure 9:
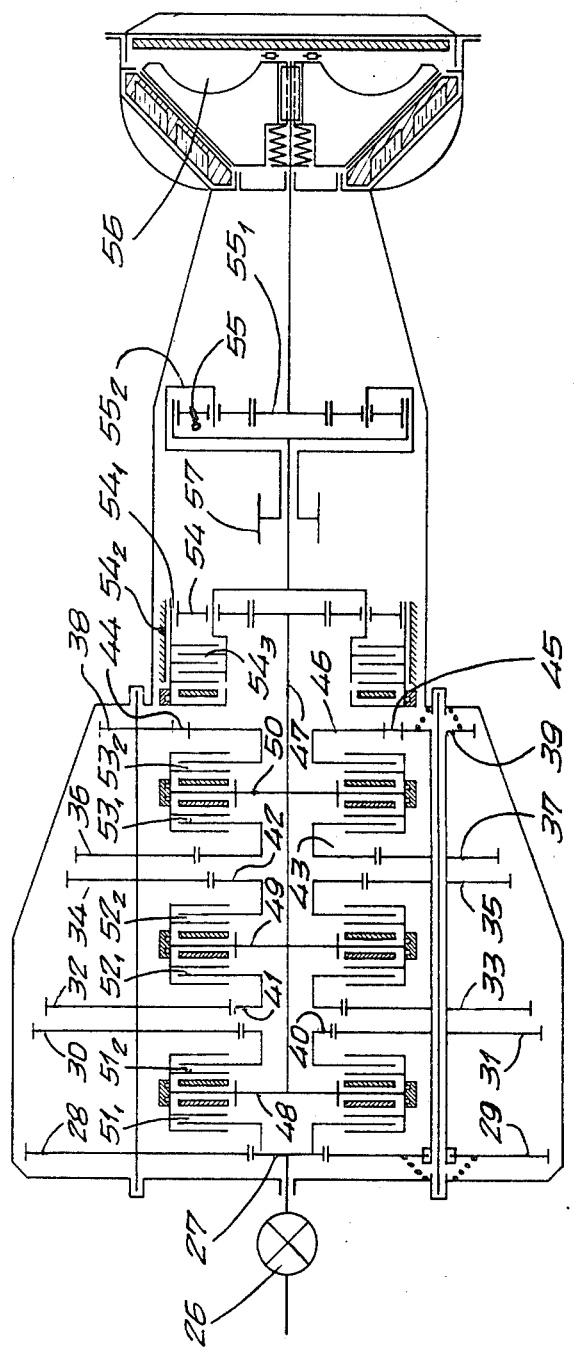

FIG. 8 is a schematic longitudinal section view through a driven unit employing a 10 speed transmission and only one pair of axle shafts being driven within the housing, FIG. 9 is a schematic cross section view through the drive unit of FIG. 8, FIG. 10 is a vertical cross section view taken along the line G — H of FIG. 11 of a tractor employing a drive unit according the embodiment of FIGS. 8 and 9, FIG. 11 is a vertical longitudinal section view taken along the line J — K of FIG. 10.

The main principles of the invention are shown in the two embodiments illustrated in the FIGS. 1 to 5 and in FIGS. 6 and 7. Referring to these drawings, the numeral 1 designates the chassis frame of the lorry and the numerals 2, 3, 4 and 5 designate the four driven wheels. The drive from the turbine or the reciprocating engine (not shown) is effected via the universal-joint shaft 6 which drives the driving wheel $7_1$, accommodated in the housing $1_1$ of the drive unit 7 of the clutch shifted change-speed transmission with the three shafts $7_2$, $7_3$ and $7_4$. Arranged on the main transmission shaft $7_2$ are three twin clutches $7_5$, $7_6$ and $7_7$ with corresponding gears $7_8$, $7_9$, $7_{10}$, $7_{11}$ and $7_{12}$ which continuously mesh with the intermediate gear rigidly arranged on the auxiliary shafts $7_3$ and $7_4$. Actuation of the rear portion (viewed in the direction of travel) of the clutch $7_7$ transmits the reverse speed via the gear $7_{12}$; actuation of the front portion of the clutch, the first forward speed via gear $7_{11}$ and actuation of the associated clutches, the second, third and fourth forward speed via the gears $7_{10}$, $7_9$, $7_8$ and, finally, closing the front portion of the clutch $7_5$ transmits the fifth direct speed to the inner sun gear $7_{13}$ of the three-component planeting gear assembly.

FIG. 3 illustrates that a brake assembly 8 is provided outwardly of the housing having a brake housing which is mounted on a shaft portion $7_{14}'$ for rotation. The shaft portion $7_{14}'$ is an axial extension of the ring gear $7_{14}$ of the planetary gear extending through an opening of the housing and being journalled in this opening. The brake assembly acts as a starting and switch device replacing the provision of a starting and switch clutch usually arranged between the engine and the transmission unput. When the brake 8 is actuated, the ring gear $7_{14}$ is locked and the torque is translated and transmitted from the sun gear $7_{13}$, via the planet gear $7_{15}$ and the axial extension $7_{16}'$ of the planet carrier $7_{16}$ to the output gear $7_{17}$ of the change speed transmission. Thus, power transmission only occurs when the brake 8 is actuated. For starting application the brake 8 is slidingly actuated providing a successive braking of the planet carrier $7_{16}$. It is obvious that also a different arrangement of the planet components may be provided if useful. Of course, the brake 8 has to be designed appropriately to dissipate the heat arising during the braking operation. A detailed description of such starting devices is in my copending continuation-inpart application Ser. No. 349,468, filed Apr. 9, 1973. FIGS. 6 and 7 illustrate the employing of a watercooled disc brake in the starting device, though other forms of watercooled brake assemblies may be applied. Referring to this preferred embodiment, FIG. 6 shows that the ring gear $7_{14}$ has an axial shaft-like extension $7_{25}$ on which a lined lamination is mounted for rotation therewith. The linings face on one side the braking surface of a brake ring $8_6$ rigidly fixed with the housing. The brake ring 8 is provided on its back side with annular channels $8_7$ through which coolant water is passed supplied through the inlet $8_8$. On the other side of the lamination an axially movable thrust ring $8_1$ which can be actuated by the hydraulic means $8_4$, $8_5$ and $8_9$ is provided.

Returning again to the description of FIG. 3 or FIG. 6, respectively, the transmission output gear $7_{17}$ is in mesh engagement with the input gear $7_{18}$ of the transfer gear assembly $7_{19}$. It is essential that the transfer gear assembly is arranged in such a manner in respect to the other parts of the drive unit that its symmetric axis is parallel to the vehicle longitudinal direction, so that the both transfer shafts extend lengthwise in the vehicle. In combination with the neighboring location of the change speed transmission and the differential gears a new compact combination is achieved enabling a common housing for all said drive unit parts.

In the preferred embodiments the transfer shaft assemblies are arranged below of the transmission driving the two transfer shafts $7_{20}$ and $7_{21}$ which drive the differential gears $7_{24}$. Since these two drives are identical in configuration, only the drive of the pair of wheels 4, 5 and finally of the wheel 4 will be described in further detail. The transfer shaft $7_{21}$ has a bevelled pinion $7_{22}$ which drives the gear $7_{23}$; whence the shafts 13 and 14 are driven via the differential gear $7_{24}$ for the drive of the wheels 4 and 5. Mounted on the shaft 13 is the brake housing $11_1$ of the wheel brake 11 of the wheel 4; the brakes associated with the wheels 2, 3 and 5 are designated by 9, 10 and 12. The brakes are preferably located within the housing. In the embodiment of FIG. 6, 7 the brakes are designed as watercooled disc brakes. Referring to FIG. 7 the brake 11 is as designed as the above described starting brake 8 employing a lined rotating lamination, a stationary watercooled brake ring and a movable thrust ring.

The housing $1_1$ has attached by means of bolts 15 a tubular carrier 16 surrounding the axle shafts. Each wheel 2, 3, 4 and 5 surrounds the axle shafts 13, 14, . . . . The wheels 2,3,4,5 are located in a crankcase 17 having an eccentric tubular portion $17_3$. The crankcases are slewably mounted on the tubular carriers $16_1$ by means of the tubular portions $17_3$ encasing the carriers and of bearings between the carriers and the portions. The axle shafts (13, 14) drive crank gears $13_1$, $17_1$ located in the crankcases (17) providing reduced speed of the wheels.

The housing is formed with the brackets $16_1$ and 19 and the extensions 20 and 21 by means of which the drive unit is elastically suspended on the chassis frame 1 by means of elastic means, for example by means of rubber thrust bearings 22, 23, 24 and 25. Below these thrust bearings 22–25, the brackets engage, via intermediate means 22', 23', 24' and 25', respectively, brackets $17_2$ integral with and extending out from crankcase portions $17_3$.

The embodiment just described reveals that the drive unit arranged at the center between the driving wheels is designed as a unit from which the driving wheels are suspended. Of course the wheels also may be mounted on rigid axles and the unit being resiliently supported on the rigid axles wherein the wheels are driven via universal-joint shafts.

For vehicles, particularly with a turbine drive which makes a cooling plant unnecessary and would involve a special water cooler for the water-cooled brakes 8 and 9, 10, 11 and 12 a brake design known as such may be adopted for both the starting brake and the wheel brakes having a rotating radially ribbed and outwardly open brake housing. Ribbing of the brake housings must then suffice on the one hand to dissipate the frictional heat generated by difficult starting processes and at the wheel brakes in sustained upward-gradient braking as well as consecutive stoppage braking by ventilation on the one hand and on the other, to ensure that an excessive loss ventilation effect is created at the highest speed in use of the vehicle. Most advantageously the five brakes are provided with the same brake-lining segments which can be pulled out of this brake system without dismantling.

In the embodiment schematically illustrated in the FIGS. 8 and 9 the drive unit comprises a 10 speed countershaft transmission and a modified starting device employing an additional planetary gear. Different from the described first embodiment, a transfer shaft extends through the unit housing to a differential gear arranged in the vehicle outwardly of the housing. This embodiment therefor may be applied in cases where the driven wheels are located at a distance in the vehicle. FIGS. 10 and 11 illustrate the application of this drive unit in a tractor.

In FIGS. 8 – 11 the reference numeral 27 designates the input gear wheel of the transmission assembly which is directly driven by the engine via the cardan joint 26, no starting clutch or torque converter being provided between the engine and the transmission. The transmission is a combination known per se of a clutch shifted countershaft transmission with a planetary gear arranged behind the transmission. The input gear 27 meshes with the gear wheels 28 and 29 of the two countershafts and which are equipped with further gear wheels 28 through 39 (FIG. 9). The wheels 30 and 31 mesh with the wheel 40, the wheels 32 and 33 with the wheel 41, the wheels 34 and 35 with the wheel 42, the wheels 36 and 37 with the wheel 43 and the wheels 38 and 39 with the gear wheel 46 of the main shaft 47 via the reversing gear wheels 44, 45. Connected with the main shaft 47 are the clutch carriers 48, 49, 50 of the double shifting clutches $51_1/51_2/52_1/52_2/53_1/53_2$. The gear wheels and shifting clutches provide a total of five forward and one reverse speeds. In order to double the number of speed ratios a planetary gear unit 54 is provided of which the ring gear $54_1$ is arrested at the first five forward speeds by the brakes $54_2$ and short-cut by a clutch $54_2$ at the five higher speeds.

The starting device in this embodiment consists of the combination of a further planetary gear 55 with a water-cooled friction brake 56. The starting unit enables power transmission from the transmission output shaft to the wheels to be discretionally engaged or disengaged. The planetary gear 55 together with the tranmission is located in the oil-filled transmission housing while the dry-running friction brake 56, which may be designed as a conical brake, it attached to the housing. The operation of the starting unit is as described in the foregoing embodiment. The transmission output gear 57 is connected to the planet carrier $55_2$ driving the input gear 58 of the transfer gear assembly 59 which is located according the foregoing description. Two of the wheels are driven via the differential gears 60, 61 and the other pair of wheels are driven via the transfer shaft 78 extending through the housing and via the cardan joint 62 by the cardan shaft 63.

The truck in which this drive unit may be arranged is equipped with the rigid rear, and front axles 65, 66 carrying the wheels 64. The drive unit 70 is suspended on the frame 69. Located above of the drive unit is the engine 71 which drives the drive unit by means of a chain 72.

On the opposite side of the chain is the radiator assembly comprising the fan 73, the radiator clutch 74 and the radiator 76. The foregoing described watercooled starting brake 56 and the watercooled wheel brakes 75 which are provided for all wheels are provided with a coolant circulating system connected to the radiator 76. Located within the wheels are pinion transmissions 67, 68 as shown for a front wheel. As FIG. 11 illustrates the front wheels are driven by the foregoing mentioned cardan shaft 63.

I claim:

1. In a vehicle with a chassis frame, a drive unit adapted to drive four wheels, the wheels being driven by axle shafts arranged transversely relative to the vehicle longitudinal direction, characterized by the combination of:
   the drive unit comprising a change speed transmission with its longitudinal direction extending lengthwise to the vehicle longitudinal direction,
   the drive unit further comprising a transfer gear assembly connected to the output of said transmission and to two transfer shafts, the transfer gear assembly being arranged in the vehicle with its transfer shafts extending parallel to the vehicle longitudinal direction,
   the drive unit further comprising differential gear driven by said transfer shafts and driving said axle shafts,
   a housing suspended on said chassis frame, said housing commonly enclosing said change speed transmission, said transfer gear assembly, at least one of said transfer shafts and at least one of said differential gears,
   a starting device between the engine and the drive unit, the starting device comprising a brake assembly arranged outwardly of the housing and having a rotating member drivingly connected with a member of said transmission.

2. A drive unit according to claim 1, wherein the wheels being attached on rigid axles carrying the said frame.

3. A drive unit according to claim 1, wherein disc brakes are arranged on the axle shafts, the disc brakes being located in said housing.

4. A drive unit according to claim 1, wherein the housing is provided with oppositely arranged brackets and extensions by means of which the housing is elastically suspended on the frame.

5. A drive unit according to claim 1, wherein the change speed transmission is a combination of a clutch shifted countershaft transmission and a planetary gear, a brake device being provided outwardly of the housing and attached thereto, a rotating member of said being in driving connection with a component of said planetary gear, the components of the planetary gear and the brake members being arranged in respect to one another such that power transmission from the engine to the driven wheels only occurs during actuated brake condition providing stationary hold of said component and such that starting occurs during sliding actuation of the brake providing successive braking of said component, thus replacing the use and the provision of the normally used starting clutch between the engine and the transmission unit.

6. A drive unit according to claim 1, wherein the change speed transmission is a combination of a clutch shifted countershaft transmission and a planetary gear, said transmission member being a component of said planetary gear, the components of the planetary gear and the brake members being arranged in respect to one another such that power transmission from the engine to the driven wheels only occurs during actuated brake condition providing stationary hold of said component and such that starting occurs during sliding actuation of the brake providing sucessive braking of said component, thus replacing the use and the provision of a normally used starting clutch between the engine and the transmission unit.

7. A drive unit according to claim 1,
   said change speed transmission being a combination of a clutch shifted countershaft transmission with a planetary gear assembly, said starting device comprising a planetary gear having several components and being located within said housing, a first of said components being drivingly connected with said rotating member of said watercooled brake, and a second of said components being drivingly engaged with said transfer gear assembly, said components and said brake members being arranged in respect to one another that power transmission only occurs when said brake is in actuated condition.

8. A drive unit according to claim 1,
   said vehicle being a tractor equipped with a rear rigid axle carrying the rear wheels and with a front rigid axle carrying the front wheels, said housing being suspended on said rigid axles, and the drive unit being located in the rear part of said tractor,
   said change speed transmission being a combination of a clutch shifted countershaft transmission with a planetary gear assembly, said starting device comprising a planetary gear having several components and being located within said housing, a first of said components being drivingly connected with said rotating member of said watercooled brake, and a second of said components being drivingly engaged with said transfer gear assembly, said components and said brake members being such arranged in respect to one another that power transmission only occurs when said brake is in actuated condition,
   said transfer gear assembly being located below said change speed transmission, the transfer shaft extending through said housing and driving by means of a cardan joint a cardan shaft driving the front axle shafts,
   watercooled disc brakes being located on each axle shaft and within said housing, the truck engine being equipped with a radiator providing a coolant water circulation through said brake of said starting device and through said disc brakes.

9. A drive unit according to claim 1, wherein the housing is provided with tubular carriers surrounding said axle shafts, the wheels being located in crankcases, each of which have an eccentric tubular portion, said crankcases being slewably mounted on said tubular carriers by means of said tubular portions encasing said carriers and of bearings between said carriers and said portions, said axle shaft drive crank gears being located in the crankcases providing reduced speed of the wheels.

10. A drive unit according to claim 1, wherein the change speed transmission is a combination of a clutch shifted countershift transmission and a planetary gear, the planetary gear comprising a driven sun gear, a ring gear, a planetary carrier carrying planetary gears meshing with said sun and ring gears, an axial extension of the planetary carrier having attached thereon the change speed transmission output gear, said output gear meshing with the input gear of said transfer gear device, the transfer gear device being located below the change speed transmission, a shaft connected with said ring gear extending through an opening of said housing and means for journalling said shaft in said opening, said rotating brake member being a lined lamination mounted on said shaft for rotation therewith, said brake assembly further comprising a brake ring mounted in the housing and provided with waterflow channels, an axially movable thrust ring and actuating means to move said thrust ring towards said lamination until friction contact, said brake assembly holding said ring gear fixed during actuation thus enabling power transmission from being designed owing to its cooling for sliding actuation thus acting as starting device replacing the provision of a normally used starting clutch, said transfer shafts and said differential gears being arranged within said housing, said housing being formed with two oppositely arranged brackets and two extensions provided with elastic bearings by means of which brackets, extensions and bearings the housing is suspended on the chassis frame, each said disc brake comprising a brake housing mounted on said axle shifts for rotation therewith providing an annular peripheral open space and said brakes further comprising a stationary spreading device extending into said annular space, said disc brakes being arranged within said housing, said housing being provided with tubular carriers surrounding said axle shafts, the wheels being located in crankcases, each having an eccentric tubular portion, said crankcases being slewably mounted on said tubular carrier by means of said tubular portions encasing said carriers and of bearings between said carriers and said portions, said axle shafts drive crank gears located in the crancases providing reduced speed of the wheels.

11. A drive unit according to claim 1, said brake assembly of the starting device being a watercooled brake assembly.

12. A drive unit according to claim 1, including disc brakes arranged on said axle shafts to brace the respective wheels.

13. A device unit according to claim 12, said disc brakes being watercooled disc brakes.

* * * * *